(12) United States Patent
Cansler et al.

(10) Patent No.: US 8,140,390 B2
(45) Date of Patent: Mar. 20, 2012

(54) SYSTEM AND METHOD FOR DISPLAYING PARTIAL ADVERTISING DATA DURING TRICK PLAY

(75) Inventors: James L. Cansler, Cedar Park, TX (US); Charles Scott, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 967 days.

(21) Appl. No.: 12/029,933

(22) Filed: Feb. 12, 2008

(65) Prior Publication Data

US 2009/0204487 A1    Aug. 13, 2009

(51) Int. Cl.
*G06Q 30/00* (2006.01)
*G05B 19/418* (2006.01)
(52) U.S. Cl. .......... 705/14.49; 725/32; 348/564
(58) Field of Classification Search .......... 725/32; 348/564
See application file for complete search history.

(56) References Cited

U.S. PATENT DOCUMENTS

| | | | | |
|---|---|---|---|---|
| 5,852,474 A | * | 12/1998 | Nakagaki et al. | 348/564 |
| 2002/0184047 A1 | * | 12/2002 | Plotnick et al. | 705/1 |
| 2005/0015795 A1 | | 1/2005 | Iggulden | |
| 2006/0143565 A1 | | 6/2006 | Jones | |
| 2007/0107011 A1 | | 5/2007 | Li | |
| 2008/0155585 A1 | * | 6/2008 | Craner et al. | 725/32 |

FOREIGN PATENT DOCUMENTS

| | | |
|---|---|---|
| EP | 1303138 | 4/2003 |
| EP | 1372339 | 12/2003 |
| WO | WO9938321 | 7/1999 |
| WO | WO2006008717 | 1/2006 |
| WO | WO2006008718 | 1/2006 |
| WO | WO2007058888 | 5/2007 |

OTHER PUBLICATIONS

"Advertisers Gain Renewed Optimism for Future of Time Shifted Video as Delivery Options Increase". PR Newswire. Journal Code: WPRW. Jun. 19, 2000.*

* cited by examiner

*Primary Examiner* — John G. Weiss
*Assistant Examiner* — Victoria Vanderhorst
(74) *Attorney, Agent, or Firm* — G. Michael Roebuck

(57) ABSTRACT

A method is disclosed including but not limited to initiating a trick play command having a trick play duration at the end user device during replay of video data an end user device main display; presenting an advertising data item having an advertising duration during execution of the trick play command; and presenting a remaining portion of the advertising data on a picture in picture (PIP) display on the main display after expiration of the trick play duration. A system is provided for executing the method. A data structure is provided in a computer readable medium for containing data used by the system and method.

15 Claims, 6 Drawing Sheets

SYSTEM AND METHOD FOR DISPLAYING PARTIAL ADVERTISING DATA DURING TRICK PLAY

FIELD OF THE DISCLOSURE

The present disclosure relates to the field of targeted advertising.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television (TV), special or pay-per-view programming, video on demand (VOD), and other content choices available to subscribers. Television advertisers now target advertisements based on regions in which the television signal is delivered. For example, viewers in a New York state region will receive different advertising data than viewers in a Texas state region.

DETAILED DESCRIPTION

Figure 1:
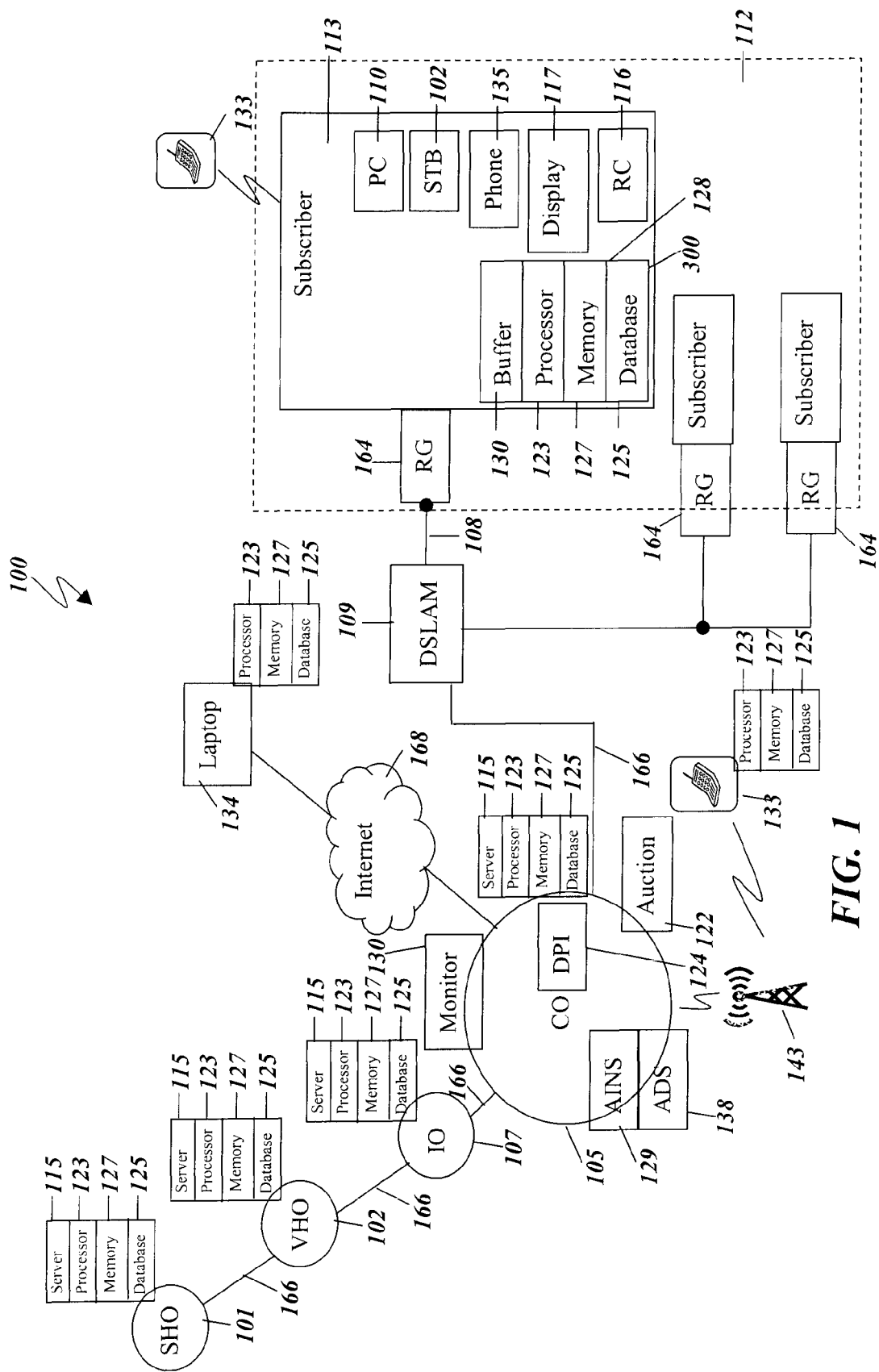
FIG. 1 depicts an illustrative embodiment of a system for delivering advertising data.

An illustrative embodiment provides an alternative way to present video data on an end user display during a digital video recorder (DVR) trick-play operation (fast-forward for example) when a trick-play command and commercials (commercial and advertising data items are used interchangeably herein to mean data comprising an advertisement(s)) are encountered. When an end user associated with an end user device is using trick play over the program portion of a broadcast DVR recording, a standard 'shuttle' view would be presented (e.g., everything on-screen is moving fast), however, when the system encounters a portion of the recording identified as a commercial, the first few seconds of that commercial (advertising data item) are displayed at normal speed. In the background, the DVR system would continue fast-forwarding, and when the next commercial is reached, the first few seconds of that commercial would be displayed, and so on. In another embodiment, when the fast-forward operation encounters the main video program data again, the video data presentation of visual and aural presentation of the sound enabled video display reverts to a standard 'shuttle' view (or alternately reverts to full-speed playback). During the few seconds of normal-speed play of advertising data items, interactive opportunities are presented to the user. For example, use of certain trick-play buttons could result in playback of the entire advertising data item instead of just the first few seconds of the advertising data item. In another example embodiment, use of 'skip forward' or 'skip back' buttons jump to the next or previous advertising data item. Graphical interface elements, messages or icons presented on the video display indicate that the trick-play operation is still in effect (e.g., I'm still fast-forwarding), and also communicate options that the user can perform if they wish to see the entire advertising data item presented.

In a particular illustrative embodiment benefits the user by allowing them to execute a trick play command (including, for example, but not limited to, fast-forward, rewind, skip forward, and skip back), with the trick-play operation taking the same amount of time. For example, if it normally takes three seconds to fast-forward over an advertising data item (referred to herein as "trick-play duration"), and then this fast-forward operation still takes three seconds. However, benefiting the advertiser, network and service provider, those three seconds are used presenting the actual advertising data item at regular speed for three seconds. This gives the advertisement the opportunity to 'hook' or grab the attention of the user. Once the user is hooked, they may watch the entire advertising data item via the interface elements described above. The result is an advertising data item (commercial) skipping system and method that satisfies the user by occupying the same amount of time as a normal trick-play operation, while giving advertisers' commercials that would otherwise be skipped at least some exposure, along with the opportunity to entice the user into watching the entire advertising data item.

In another illustrative embodiment, a computer readable medium, containing a computer program comprising computer executable instructions for performing a method of presenting advertising data at an end user device is disclosed, the method including but not limited to presenting video data on an end user device main display at an end user device; initiating a trick play command having a trick play duration, at the end user device during replay of the video data at an end user device main display; presenting a primary advertising data item during execution of the trick play command, the advertising data item having an advertising data item duration; and presenting a remaining portion of the primary advertising data during a remaining portion of the advertising data item duration on a picture in picture (PIP) display on the main display after expiration of the trick play duration.

In another illustrative embodiment, the method further includes but is not limited to presenting a plurality of secondary advertising data items in PIP displays on the main display during presentation of the advertising data on the main display; and presenting each of the secondary advertising data items one at a time on the main display. In another illustrative embodiment of the method, each of the secondary advertising data items is presented on the main display for a pro rata portion of the trick play duration and presented in a PIP display when not presented on the main display. In another illustrative embodiment of the method, the advertising data items are identified in the video data during reception of the video data from a communication network at the end user device.

In another illustrative embodiment of the method, the trick play duration is calculated based on the trick play command requested and the advertising data item duration is calculated based on the length of the advertising data items identified in the video data. In another illustrative embodiment of the method, an advertising data item is selected for display based on a price paid for the primary advertising data item to achieve display priority over the secondary advertising data items. In another illustrative embodiment of the method, a primary advertising data item is selected for display based on a correlation between the primary advertising data and end user profile data for an end user at the end user device.

In another illustrative embodiment of the method, presentation duration for each advertising data item on the main display is based on a correlation between the advertising data item and the end user profile for an end user at the end user device. In another illustrative embodiment of the method, the method further includes but is not limited to buffering the advertising data items in a memory buffer at the end user device for presentation during play back of the video data.

In another illustrative embodiment a system for presenting advertising data at an end user device is disclosed, the system including but not limited to a processor in data communication with a computer readable medium; a buffer in data communication with the processor; and a computer program comprising computer executable instructions, the computer program comprising instructions to present video data on an end user device main display at and end user device; instructions to initiate a trick play command having a trick play duration, at the end user device in a communication network during replay of the video data at an end user device main display; instructions to present a primary advertising data item during execution of the trick play command, the advertising data item having an advertising data item duration; and instructions to present a remaining portion of the primary advertising data during a remaining portion of the advertising data item duration on a picture in picture (PIP) display on the main display after expiration of the trick play duration.

In another illustrative embodiment of the system, the computer program further includes but is not limited to instructions to present a plurality of secondary advertising data items in PIP displays on the main display during presentation of the advertising data on the main display; and instructions to present each of the secondary advertising data items on the main display. In another illustrative embodiment of the system, each of the secondary advertising data items is presented on the main display for a pro rata portion of the trick play duration. In another illustrative embodiment of the system, the advertising data items are identified in the video data during reception of the video data from a communication network at the end user device.

In another illustrative embodiment of the system, the trick play duration is calculated based on the trick play command requested and the advertising data item duration is calculated based on the length of the advertising data items identified in the video data. In another illustrative embodiment of the system, an advertising data item is selected for display based on a price paid for the primary advertising data item to achieve display priority over the secondary advertising data items. In another illustrative embodiment of the system, a primary advertising data item is selected for display based on a correlation between advertising characterization data for the primary advertising data and end user profile data for an end user at the end user device. In another illustrative embodiment of the system, presentation duration for each advertising data item on the main display is based on a correlation between the advertising data item and the end user profile data for an end user at the end user device. In another illustrative embodiment of the system, the computer program further includes but is not limited to instructions to buffer the advertising data items in a memory buffer at the end user device for presentation during play back of the video data.

In another illustrative embodiment, a data structure embedded in a computer readable medium is disclosed, the data structure including but not limited to a first field for containing data indicative of a primary advertising data item duration for advertising data items identified in a video data stream at an end user device; a second field for containing data indicative of a trick play duration for a trick play command for the video data at the end user device; and a third field for containing data indicative of a picture in picture (PIP) display for displaying a remaining portion of the primary advertising data item during a remaining portion of the primary advertising data item duration after expiration of the trick play duration.

In another illustrative embodiment of the data structure, the data structure further includes but is not limited to a fourth field for containing data indicative of secondary advertising data items for display in PIP displays during a total advertising data duration; and a fifth field for containing data indicative of total advertising data duration for the primary advertising data item and the secondary advertising data items for determining a pro rata display duration for each advertising data item.

Turning now to FIG. 1, FIG. 1 depicts an illustrative embodiment of a system for automatically selecting advertising data for a subscriber based on content of video and other data stored at end user devices in data communication system, such as an IPTV system. The IPTV system provides IPTV video data, VoIP data and Internet data services to end user devices. The IPTV system provides IPTV video, high speed internet video and other data from high speed internet and VoIP data and video. The video can be video data including but not limited to television programming, movies, and video on demand in which Meta data describing the video and advertising data may be supplied; or video data without associated Meta data for subscriber created videos such as video data provided on popular Internet sites such as My Space™ and You Tube™. Meta data for movies and television programs include title and description for the video. In an illustrative embodiment, advertising characterization data is generated at the end user device or upstream in the IPTV system by processing the video and advertising data using image recognition, speech to text recognition, character recognition and meta data for the video to characterize the advertising data in the video data stream that is being watched or is scheduled to be watched at an end user device.

In an illustrative embodiment, the IPTV system builds subscriber or end user profile data for IPTV end users devices by aggregating and correlating subscriber related statistics and subscriber activity data along with other subscriber data and demographic information such as gender, age, income, languages spoken, areas of interest, etc. for IPTV subscribers of other end users associated with the end user devices. Some of the end user profile data can be volunteered by an IPTV subscriber during an IPTV registration process. In another particular embodiment, the subscriber profile data further contains data for which a subscriber has opted in for monitoring and use by an IPTV system for the purposes of automatically receiving targeted advertising data. Subscriber preferences for particular advertising classes of current viewers can be estimated from data included in the end user or subscriber profile data, including but not limited to device type, end user type, and device state based on the subscriber activity data.

Based on a subscribers' interests, background, and subscriber profiling results, purchases, locations visited, demographics and subscriber activity data, advertising data selection and presentation methods and systems described herein or an equivalent thereof can be utilized to estimate an auction price and select priority advertising data items stored in a buffer at an end user device. Targeted advertising data is automatically selected and made available to personalize advertising data and television commercial delivery to IPTV television displays, portable subscriber data and messaging devices such as mobile or cell phones and video, website banners and pop up displays on a PC or mobile Laptop computer. Advertising data items are automatically detected in the video data stream, selected and made available to for presentation during trick play at an end user device. Correlation between advertising characterization data and end user profile data personalize advertising data and television commercial delivery to IPTV system displays, portable subscriber data and messaging devices such as mobile or cell phones and video, website banners and pop up displays on a PC or mobile Laptop computer.

As shown in FIG. 1, in an illustrative embodiment an IPTV system 100 delivers video content data and advertising data to subscriber house holds 113 and associated end user devices (also referred to herein as subscriber devices) which may be inside or outside of the household. Television advertising data is inserted or marked as available by the advertising server 138. In the IPTV system, IPTV video data are broadcast in an internet protocol (IP) format from a server at a super hub office (SHO) 101 to a regional or local IPTV video hub office (VHO) server 103, to a central office (CO) server 105 and intermediate office (IO) 107. The IPTV system 100 includes a hierarchically arranged network of servers wherein the SHO transmits video and advertising data to a video hub office (VHO) 103 and the VHO transmits to an IPTV server location close to a subscriber, such as a CO server 105 or IO 107. In another particular embodiment, each of the SHO, VHO, CO, and IO is interconnected with an IPTV transport 166. In a particular embodiment, the IPTV transport 166 includes, but is not limited to high speed fiber optic cables interconnected with routers for transmission of internet protocol data. The IPTV servers also provide data communication for data and video associated with Internet and VoIP services to subscribers. End user devices can access the Internet 168, Voice over IP and cell phone system 143 via the IPTV system.

Actively viewed IPTV channels including video data and advertising data are sent to end user devices in an IP data multicast group to access nodes such as digital subscriber line access multiplexers (DSLAMS) 109. A multicast for a particular IPTV channel is joined over a DSL line 108 from the DSLAM by an end user device, such as the set-top boxes (STBs) at IPTV subscriber homes. Each STB includes processor 123, a memory 127, and a database 125. Each SHO, VHO, CO and IO includes a server 115, processor 123, a memory 127, and a database 125. The processor 123 further includes a network interface. The processor reads computer programs data containing executable instructions from a computer readable medium such as memory 127. The network interface functions to send and receive data over the IPTV transport 166 and DSL line 108. The CO server delivers IPTV, Internet and VoIP video content and data to the subscriber via the DSLAM. The television, internet and VoIP data and content can be delivered via multicast and unicast television advertising depending on a single subscriber or a targeted television advertising group of end user client subscriber devices to which the advertising data is directed.

In another particular embodiment, subscriber devices, including but not limited to, wire line phones 135, portable phones 133, mobile computer 134 personal computers (PC) 110 and STB 102 communicate with a communication system, e.g., IPTV system through residential gateway (RG) 164 and high speed communication lines 108 and 166. In another particular embodiment, deep packet inspection (DPI) device 124 inspects VoIP, Internet and IPTV video data, advertising data, computer data, commands and Meta data transmitted between the subscriber devices (subscriber activity data) and the IPTV system servers to build the end user profiles and to identify and characterize advertising data items. In another illustrative embodiment, subscriber activity data are monitored and collected whether or not the subscriber's devices are in the household 113 or traveling as mobile devices outside of the household. When outside of the household, subscriber mobile device activity data and transactions data are monitored by a communication network (e.g., IPTV system) servers or nodes which associate the subscriber activity data with particular subscriber's end user devices. In another particular embodiment, subscriber activity data such as communication and purchase transactions are inspected by DPI devices located in a communication system, e.g., IPTV system servers and used to add to the end user profiles. These communication system servers route the subscriber activity data to an IPTV server such as the CO in which the subscriber activity data for a subscriber are stored for processing into the end use profiles data. While an IPTV system has been used as an example in the illustrative embodiment, the disclosure is not meant to be limited to IPTV as other communication systems such as cable television or other digital and analog data delivery systems can be used in other embodiments.

In another particular embodiment, the end user devices further include but are not limited to a client user computer, a personal computer (PC), a tablet PC, a set-top box (STB), a Personal Digital Assistant (PDA), a cellular telephone, a mobile device, a palm computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP video data and advertising data, Internet video and data and IPTV video and data, commands and Meta data between the subscriber end user devices and the IPTV system servers and the Internet. The DPI device assists in advertising data characterization.

When outside of the household, subscriber mobile device data are monitored by communication system servers (e.g., IPTV system) which associate the subscriber activity data with each particular subscriber's end user device. In another particular embodiment, subscriber activity data such as IPTV and Internet video selections, and communication and purchase transactions are inspected by DPI devices located in a communication system, e.g., IPTV system servers. These communication system servers route the subscriber activity data to a CO in which the subscriber activity data for a subscriber are stored for processing and become part of the historical behavior profile for the end user.

As shown in FIG. 1 advertising sub groups 112 (comprising a group of subscriber house holds 113) receive multicast video and advertising data at STB 102 in a video data stream from CO server 107 and DSLAM 109. Individual households 113 receive advertising data at set top box 102 or one of the other end user devices. More than one STB 102 can be located in an individual household 113 and each individual STB can receive a separate multicast or unicast advertising data stream on IPTV transport 166. In another particular illustrative embodiment, separate and unique advertising unicast data are sent form the IPTV system advertising server via a DSLAM to each set top box (STB) 102 tailored to target the particular subscriber watching television at that particular STB. Each STB 102 has an associated remote control (RC) 116 and video display 117. The subscriber/end user via the RC selects channels for a video data viewing selection (video programs, games, movies, video on demand) and places orders for products and services over the IPTV system 100.

FIG. 1 depicts an illustrative communication system, including but not limited to a television advertising insertion system wherein television advertising data can be inserted at an internet protocol television (IPTV) server (SHO, VHO, CO, IO) for delivery to an end user device, for example, an STB, mobile phone, web browser or personal computer. Advertising data can be inserted into or made available during replay of IPTV or other video data stored at an end user device. The advertising data is delivered via advertising insertion device 129 located at the IPTV CO server or at one of the end user devices such as the STB 102 or other end user device which inserts the advertising data into video data. The IPTV servers include an advertising server (AINS) 129 and an advertising database (ADS) 138. The advertising data is selected by advertising selection element 129 from the advertising database 138 based on an auction for an available advertising spot based on a subscriber/end user profile data and delivered by the VHO advertising server 138. A SHO 101 distributes data to a regional VHO 103 which distributes data to local COs 105 which distributes data to a digital subscriber access line access multiplexer (DSLAM) access node to subscriber devices such as STB 102, PC 110, wire line phone 135, mobile phone 133, etc. Advertising data is also selected based on the subscriber profile data and sent to a mobile phone or computer associated with the subscriber. The subscriber profile is built based on a subscriber's IPTV, Internet and VoIP activity, demographic data and subscriber activity data. The targeted advertisements and other advertising data that are embedded in the incoming video data stream to an end user device are stored at the end user device advertising data buffer 130.

Figure 2:
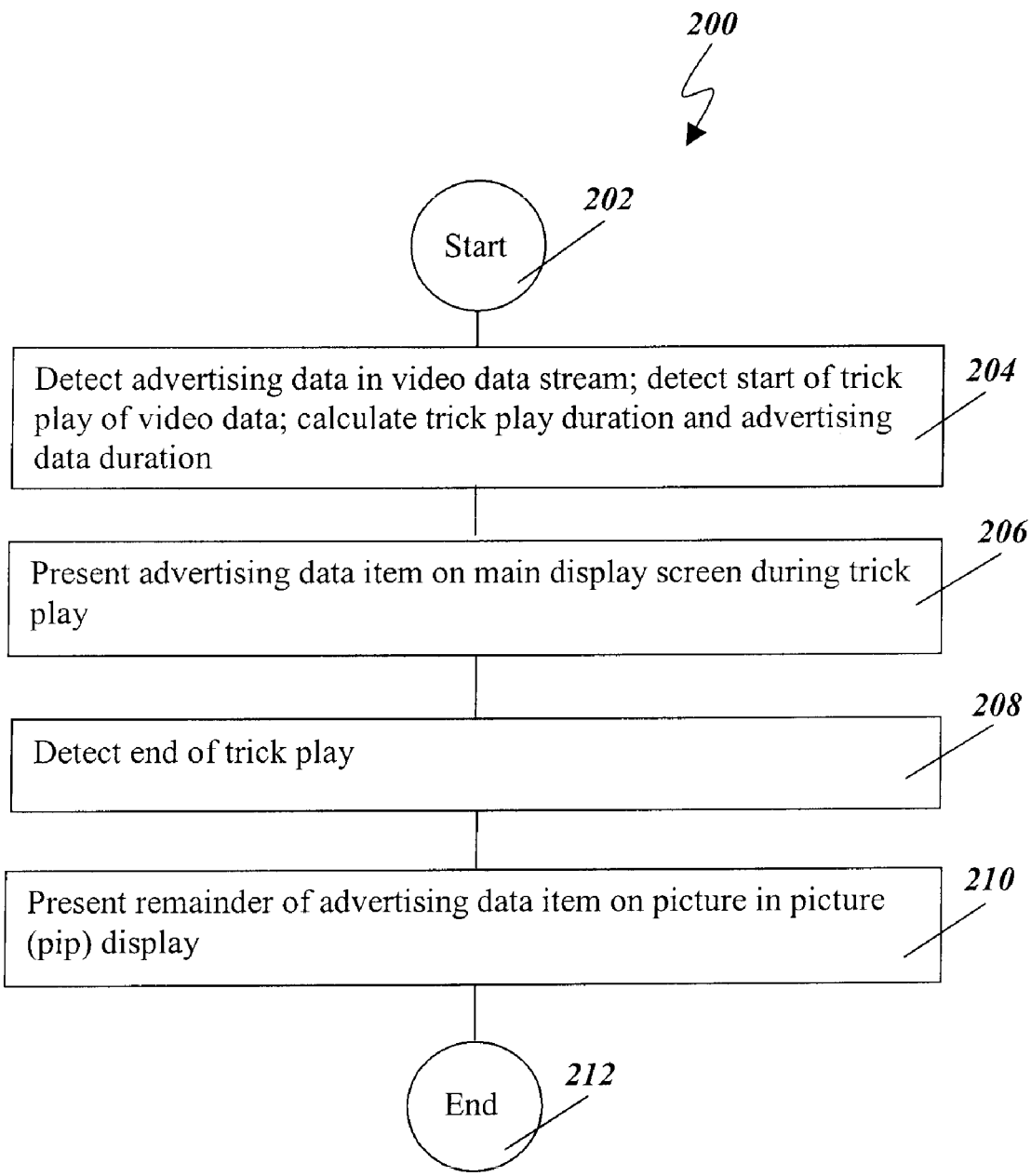
FIG. 2 depicts a flow chart of functions performed in an illustrative method for delivering advertising data.

Turning now to FIG. 2, in an illustrative embodiment, a flowchart 200 of functions is performed as illustrated in FIG. 2. The execution of functions illustrated in any flow chart illustrated in this disclosure is not dictated by the order of the flow chart, including but not limited to the flow charts of FIG. 2 and FIG. 3, as the functions shown in any flow chart can be executed in any order as well as one or more functions can be left out of execution altogether in other particular embodiments. In a particular illustrative embodiment, the function execution starts at terminal 202 and proceeds to block 204, where a particular illustrative embodiment detects advertising data items in the video data stream. The advertising data items are detected at the CO level in the CO server and advertising data characterization performed in a particular illustrative embodiment at the CO level server. In another embodiment, the advertising data items are detected at the end user device level in the end user device processor and advertising data characterization performed in a particular illustrative embodiment at the end user processor. The detected advertising data items are stored in a buffer at the end-user device. An illustrative embodiment detects a start of a trick play command data for the presentation of video data. An illustrative embodiment, calculates the duration of the trick play command as well as the duration of the advertising data items detected and stored in the buffer. An illustrative embodiment then proceeds to block 206 and presents the advertising data item on the main display screen during trick play command execution. An illustrative embodiment then proceeds to block 208 and detects the end of the trick play command execution duration. An illustrative embodiment then proceeds to block 210 and presents the remainder of the advertising data item on a picture-in-picture (PIP) display within the main display screen. An illustrative embodiment ends at terminal 212.

Figure 3:
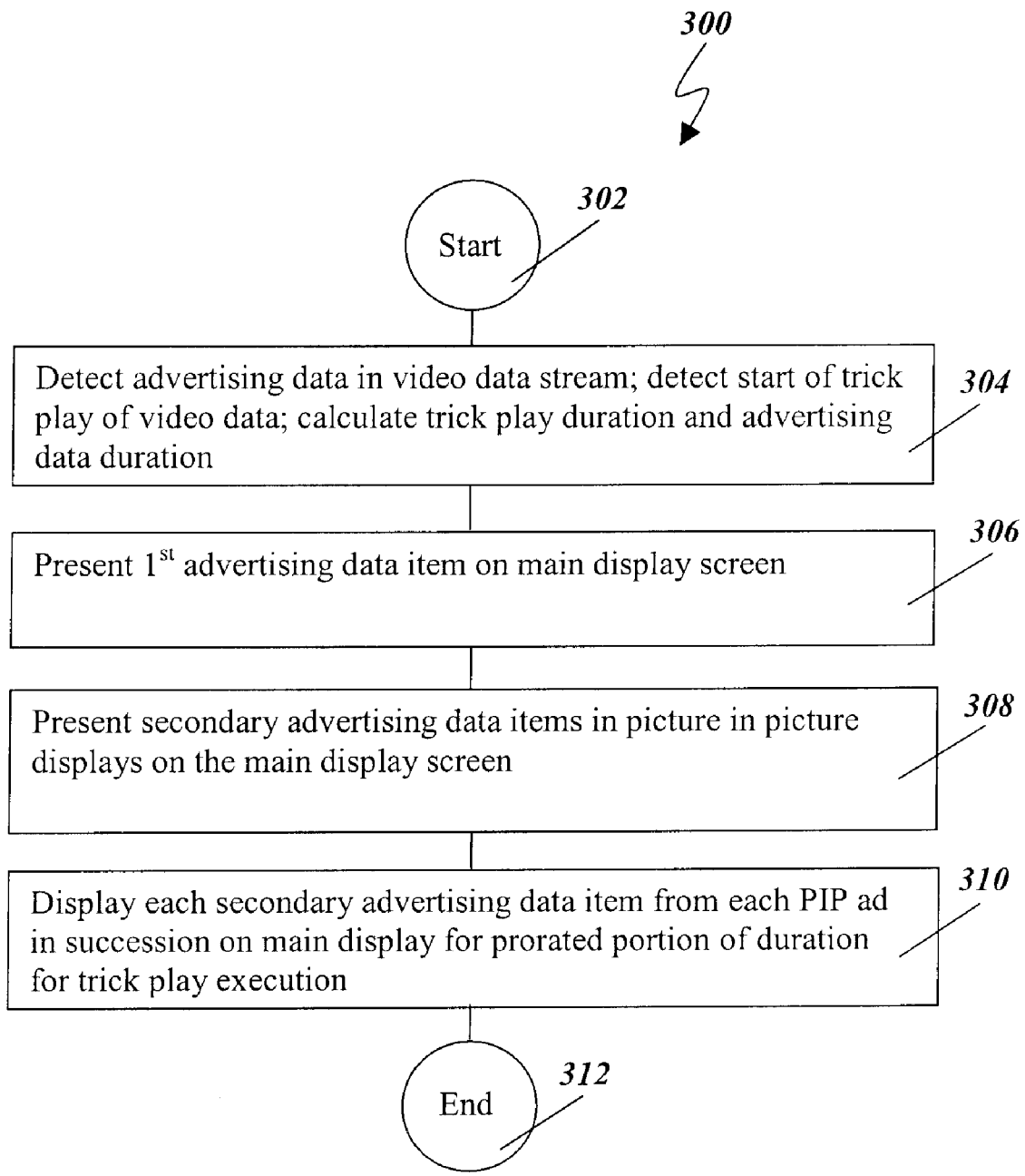
FIG. 3 depicts a flow chart of functions performed in another illustrative method for delivering advertising data.

Turning now to FIG. 3, in another particular illustrative embodiment, a flowchart of functions is performed as shown in flowchart 300. Flowchart 300 indicates that another particular embodiment begins execution of functions at terminal 302 and proceeds to block 304 and detects advertising data in the video data stream, performs advertising data characterization and stores the advertising data as advertising data items in a buffer at the end-user device. An illustrative embodiment then calculates the trick play execution duration and the advertising data duration for the advertising data items detected in the video data stream. In another illustrative embodiment, the advertising data items are detected upstream in the IPTV system and the duration of trick play and advertising characterization data for the advertising data items calculated upstream and sent to the end user device in a data stream. In another illustrative embodiment, the advertising data items are detected at the end user device in the IPTV system and the duration of trick play and advertising characterization data for the advertising data items calculated at the end user device.

An illustrative embodiment then proceeds to block 306 and presents the first or primary advertising data item on the main display screen during the duration of the trick play execution. An illustrative embodiment then proceeds to block 308 where it presents the secondary advertising data items in a PIP displays on the main display screen. An illustrative embodiment then proceeds to block 310 and displays each secondary advertising data item from each PIP display in succession on the main display for a prorated portion of the duration of trick play execution command. The prorated duration can be a prorated portion of the trick-play command execution duration or a prorated portion of extended trick-play command execution duration. The prorated duration for each advertising data item is calculated based on one or more of the following factors: normal display duration for each advertising data item selected for display versus the total normal display duration of all advertising data items selected for display; comparative degree of correlation for each advertising data item between the end user profile and the advertising characterization data; and comparative costs paid by an advertiser for presentation of particular advertising data items.

Figure 4:
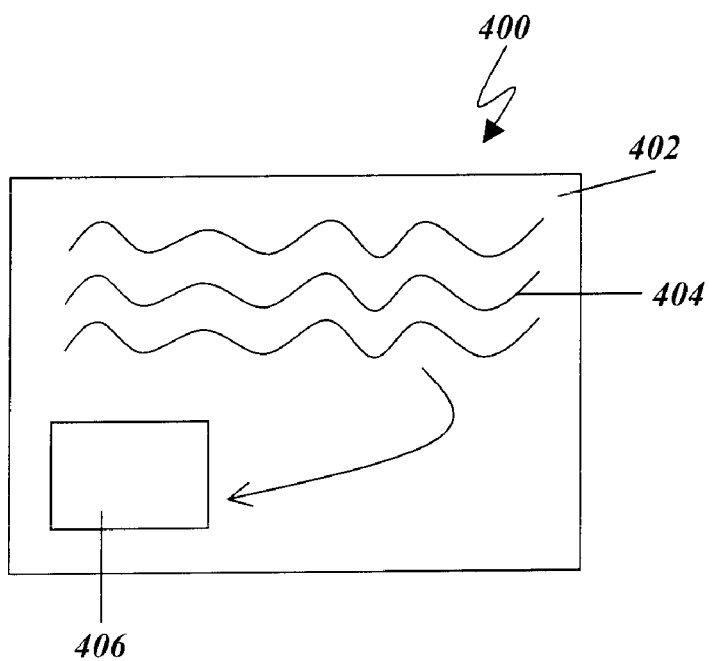
FIG. 4 is an illustration of an illustrative embodiment of an advertising data item display in which the advertising data item is displayed on a main screen during trick play and a picture in picture display afterwards.

Turning now to FIG. 4, in another illustrative embodiment 400, the advertising data 404 is presented on main display 402 during trick play execution. After the expiration of the trick play execution duration, that is the end of the trick-play execution, which in some embodiments is extended beyond the trick-play execution duration, the advertising data remaining to be displayed is then presented in a PIP display 406. A particular illustrative embodiment uses the advertising data queue to determine which advertising data item is present in the main display and the PIP display.

Figure 5:
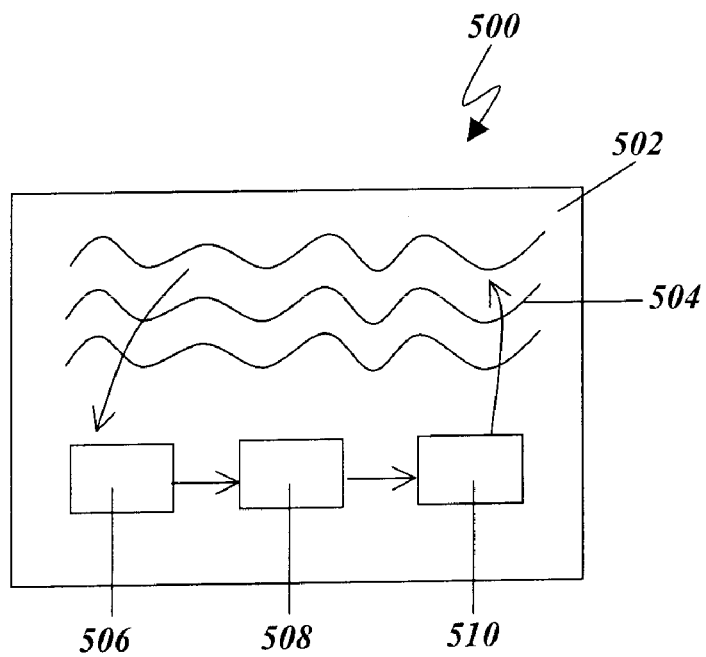
FIG. 5 is an illustration of an illustrative embodiment of an advertising display in which a plurality of advertising data items are displayed on a main screen during trick play and a picture in picture and rotated through the main screen display.

Turning now to FIG. 5, in another illustrative embodiment, a primary advertising data items is presented first in the main display 502 and secondary advertising data items are presented alternatively in PIP windows 506, 508 and 510. The secondary advertising data items are presented one at a time on the main display. In a particular embodiment selection of primary advertising data items and secondary advertising data items is dictated by the advertising data queue. In another embodiment, the primary and secondary data items are received from the IPTV system via a data stream to the end user device (multicast or unicast) and mapped to the main display or PIP displays by the end user device based on the advertising data queue.

Figure 6:
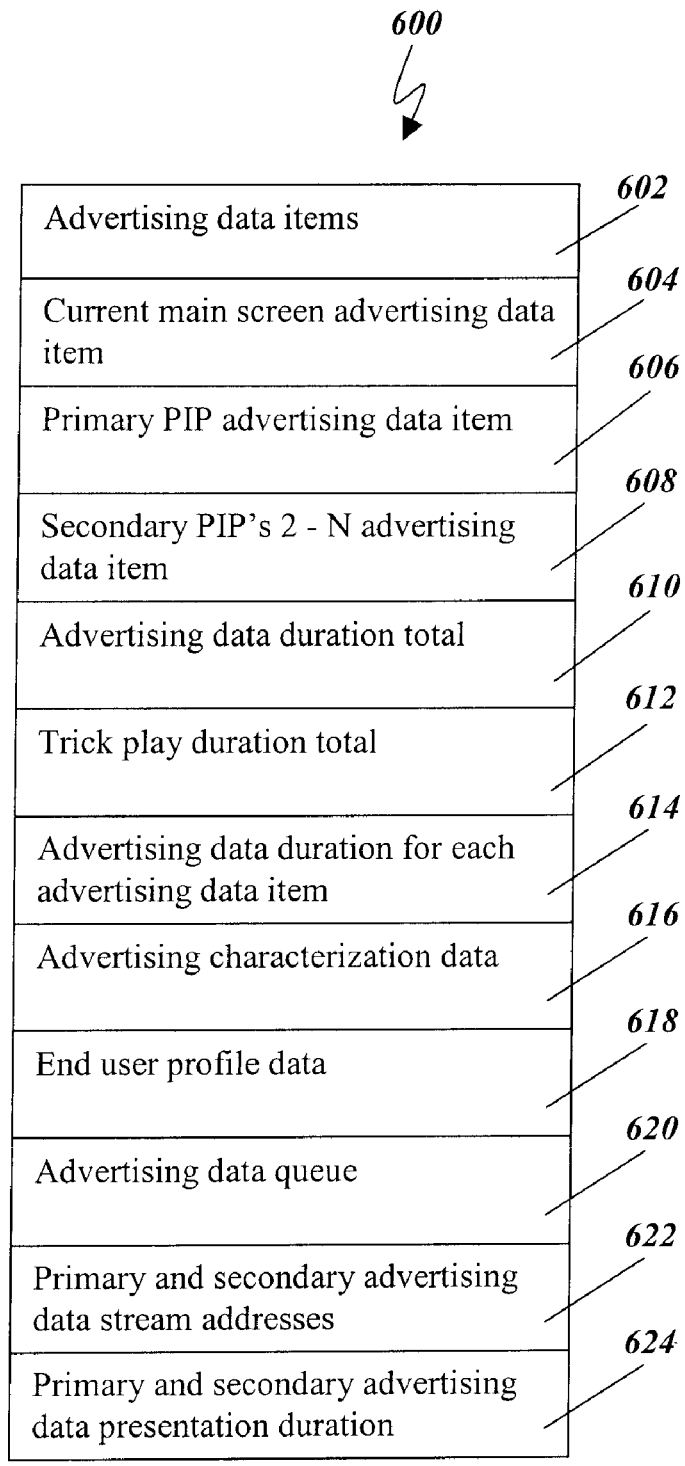
FIG. 6 is an illustration of a data structure embedded in computer readable medium.

Turning now to FIG. 6, an illustrative embodiment of a data structure 600 embedded in computer readable memory is disclosed. As shown in FIG. 6, the data structure includes a field 602 for containing data indicative of advertising data items. The advertising data items are associated with advertising characterization data stored in the data base. The advertising data items are detected in the incoming video data stream and stored in a buffer in memory. In an illustrative embodiment, the data structure further includes a field 604 for containing data indicative of the advertising display data item currently displayed on main display. In another illustrative embodiment the data structure further includes a field 606 for containing data indicative of a primary PIP advertising data item. The primary PIP advertising data item indicates the advertising data item that is presently presented in the first PIP display space 502 on the main screen. The data structure further includes a field 608 for containing data indicative of secondary PIP advertising data items 1–N, in PIP windows 504, 506 where the total number of advertising data items (primary data items plus second data items) equals N+1. The field 608 indicates advertising data items displayed within the PIP displays 1 through N. The PIP displays of secondary advertising data items are rotated through the main screen advertising display space as described herein.

The primary advertising data item on the main display is replaced on the main display by each of the secondary advertising data items from the PIP displays one at a time. The primary data item is chosen based on a price paid to display the advertising data item and a correlation index from a correlation between the advertising characterization data for the advertising data item and end user profile data. In another illustrative embodiment, the data structure further includes a field 610 for containing data indicative of the total duration of the primary and secondary advertising data items. In another illustrative embodiment, the data structure further includes a field 612 for containing data indicative of the trick play duration total time. In another illustrative embodiment the data structure further includes a field 614 for containing data indicative of the duration for each primary and secondary advertising data item. In another illustrative embodiment the data structure further includes a field 616 for containing data indicative of the advertising characterization data for the advertising data items.

In another illustrative embodiment the data structure further includes a field 618 for containing data indicative of the end user profile data. The end user profile data is correlated with the advertising characterization data to generate a degree of correlation or a correlative index for each primary and secondary advertising data item. In another illustrative embodiment the data structure further includes a field 620 for containing data indicative of an advertising data queue. The advertising data queue identifies primary and secondary advertising data items for display on the main display screen and each of the PIP screens. In another illustrative embodiment the data structure further includes a field 622 for containing data indicative of primary and secondary data stream addresses. The primary and secondary advertising data stream addresses are delivered from the IPTV system in multicast and/or unicast and joined by the end user device to receive advertising data for display of each of the PIP displays and the main display.

In a particular illustrative embodiment, the advertising data streams are mapped to the main display and PIP displays according to the advertising data queue which dynamically identifies primary and secondary data items for display on the main display screen and each of the PIP display screens. In a particular embodiment, end users receive the same advertising data stream containing the same primary and secondary data items but receive different advertising data queue data via unicast or a separate multicast address. In a particular embodiment, end users receive a different advertising data stream containing different primary and secondary data items and receive different advertising data queue data via unicast or a separate multicast address. In another illustrative embodiment the data structure further includes a field 624 for containing data indicative of primary and secondary data presentation duration. The presentation duration dynamically indicates how long a particular primary or secondary advertising data item is presented in a particular main display or PIP window display.

The advertising data queue, primary and secondary data stream addresses and primary and secondary data presentation duration are updated dynamically. These dynamic updates are based on several factors, including but not limited to, IPTV system data transmission bandwidth available between the IPTV system and the end user device, changing advertising goals for advertisers who in turn provide different advertising data types of advertising data items thereby causing an embodiment to generate different advertising data to correlate with an end user profile for selecting an advertising data item to be presented and changes in end user profile data.

In another embodiment a system and method are provided that detect the presence of a trick play command, a PIP data stream containing primary and secondary advertising data items and a main data stream containing video data items for display at an end user device. In this particular embodiment, data indicating a queue of advertising data items is transmitted over the PIP data stream. The queue contains data that identifies primary and secondary advertising data items for display in PIP and main display areas of an end user device display. The advertising data may be the same or different for different individual users. In a particular embodiment, the advertising data is sent via multicast to a group of end user devices. In a particular embodiment, the advertising data is sent via unicast to each of a group of end user devices. In another embodiment, an advertising data queue is sent to each end user device to direct presentation in PIP and main screen display of primary and secondary data items in the advertising data delivered by multicast.

Figure 7:
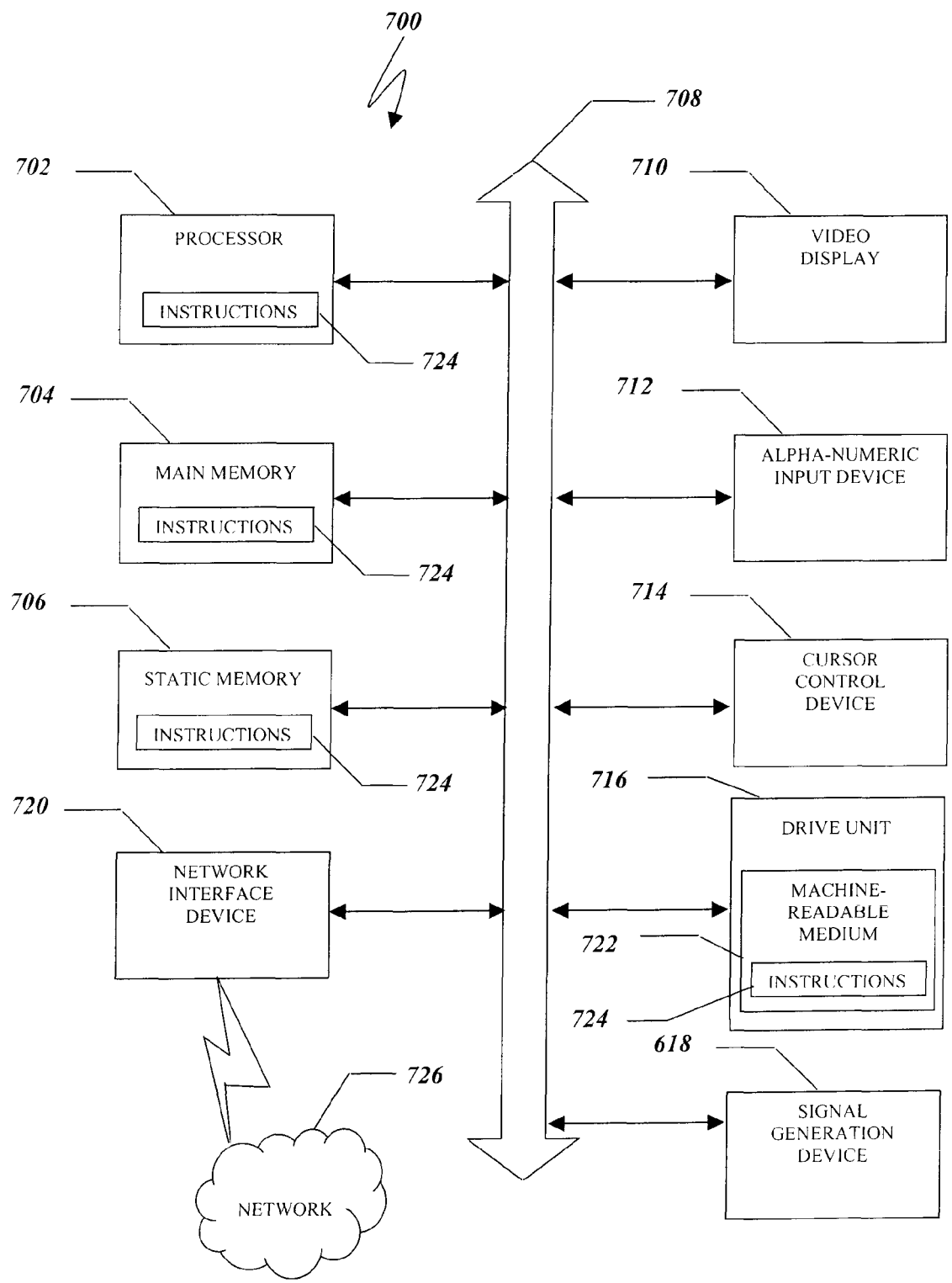
FIG. 7 is an illustrative embodiment of a machine for performing functions disclosed in an illustrative embodiment.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., liquid crystals display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present invention contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720. The machine readable medium may also contain a data structure for containing data useful in providing a functional relationship between the data and a machine or computer in an illustrative embodiment of the disclosed system and method.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable storage medium, containing a computer program comprising computer executable instructions for performing a method of presenting advertising data at an end user device, the computer program comprising:
instructions to present video data on an end user device main display at the end user device;
instructions to receive a trick play command data having a trick play duration, at the end user device during the replay presentation of the video data at the end user device main display;
instructions to present on the end user main display at the end user device, a primary advertising data item during execution of the trick play command, the advertising data item having an advertising data item duration; and
instructions to present a remaining portion of the primary advertising data item during a remaining portion of the advertising data item duration on a picture in picture display on the main display after expiration of the trick play durations;
instructions to present a plurality of secondary advertising data items in picture in picture displays on the main display during presentation of a remaining portion of the primary advertising data on the main display; and
instructions to also present each of the secondary advertising data items one at a time on the main display, wherein each of the secondary advertising data items are presented on the main display for a prorated portion of the trick play duration wherein the duration of each of the secondary advertising data items on the main display is based on a correlation between advertising characterization data for each of the secondary advertising data items and an end user profile for an end user associated with the end user device.

2. The medium of claim 1, wherein the advertising data items are identified in the video data during reception of the video data from a communication network at the end user device, the method further comprising buffering the advertising data items in a memory buffer at the end user device for presentation during play back of the video data.

3. The medium of claim 2, wherein the trick play duration is calculated based on the trick play command and the advertising data item duration is calculated based on the length of the advertising data items identified in the video data.

4. The medium of claim 3, wherein an advertising data item is selected for display based on a price paid for the primary advertising data item to achieve display priority over the secondary advertising data items.

5. The medium of claim 3, the computer program further comprising instructions to select the primary advertising data item and presentation duration for the primary advertising data item for display based on a correlation between advertising characterization data for the primary advertising data and end user profile data for an end user at the end user device.

6. The medium of claim 5, the computer program further comprising:

instructions to receive addresses for a primary and secondary advertising data stream containing the primary and secondary advertising data items from an internet protocol television system;
instructions to receive an advertising data queue from the internet protocol television system identifying an primary and secondary advertising data items presentation sequence and presentation duration on the main display and picture in picture displays; and
instructions to present the primary and secondary advertising data received from the primary and secondary advertising data streams in the presentation sequence and for the presentation duration on the main display and picture in picture displays.

7. The medium of claim 6, wherein the instructions to present further comprises instructions to map each primary and secondary advertising data stream to the main display and picture in picture displays for the presentation duration on the main display and picture in picture displays.

8. A system for presenting advertising data at an end user device, the system comprising:
a processor in data communication with a non-transitory computer readable storage medium;
a buffer in data communication with the processor;
a computer program comprising computer executable instructions stored in the non-transitory computer readable medium, the computer program comprising instructions to present video data on an end user device main display at and end user device;
instructions to initiate a trick play command having a trick play duration, at the end user device during replay of the video data at the end user device main display;
instructions to present on the end user main display at the end user device a primary advertising data item during execution of the trick play command, the advertising data item having an advertising data item duration;
instructions to present a remaining portion of the primary advertising data item during a remaining portion of the advertising data item duration on a picture in picture display on the main display after expiration of the trick play duration,
instructions to present a plurality of secondary advertising data items in picture in picture displays on the main display during presentation of the primary advertising data on the main display; and
instructions to also present each of the secondary advertising data items one at a time on the main display, wherein each of the secondary advertising data items are also presented on the main display for a prorated portion of a remaining portion of the trick play duration wherein the duration of each of the secondary advertising data items on the main display is based on a correlation between advertising characterization data for each of the secondary advertising data items and an end user profile for an end user associated with the end user device.

9. The system of claim 8, wherein the advertising data items are identified in the video data during reception of the video data from a communication network at the end user device.

10. The system of claim 9, wherein the trick play duration is calculated based on the trick play command requested and the advertising data item duration is calculated based on the length of the advertising data items identified in the video data.

11. The system of claim 10, wherein an advertising data item is selected for display based on a price paid for the primary advertising data item to achieve display priority over the secondary advertising data items.

12. The system of claim 10, wherein the primary advertising data item is selected for display based on a correlation between advertising characterization data for the primary advertising data and an end user profile for an end user at the end user device.

13. The system of claim 12, wherein presentation duration for each advertising data item displayed on the main display is based on a correlation between advertising characterization data for the advertising data item and the end user profile data for an end user at the end user device.

14. The system of claim 9, the computer program further comprising instructions to buffer the advertising data items in a memory buffer at the end user device for presentation during play back of the video data.

15. A data structure embedded in a non-transitory computer readable storage medium, the data structure comprising:
- a first field for containing data indicative of a primary advertising data item duration for advertising data items identified in a video data stream at an end user device;
- a second field for containing data indicative of a trick play duration for a trick play command for the video data at the end user device; and
- a third field for containing data indicative of a picture in picture display for displaying a remaining portion of the primary advertising data item during a remaining portion of the primary advertising data item duration after expiration of the trick play duration;
- a fourth field for containing data indicative of secondary advertising data items for display in picture in picture displays during a total advertising data; and
- a fifth field for containing data indicative of total advertising data duration for the primary advertising data item and each of the secondary advertising data items for determining a prorated display duration for each advertising data item duration, wherein the duration for each secondary advertising data item is based on a correlation between each advertising data for the secondary advertising data item and a profile for an end user associated with the end user device.

* * * * *